(12) United States Patent
Simcoe et al.

(10) Patent No.: US 8,769,137 B2
(45) Date of Patent: Jul. 1, 2014

(54) SYSTEMS AND METHODS FOR NEGOTIATED ACCELERATED BLOCK OPTION FOR TRIVIAL FILE TRANSFER PROTOCOL (TFTP)

(75) Inventors: Nathan John Simcoe, Phoenix, AZ (US); Steven James Darr, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 356 days.

(21) Appl. No.: 13/167,440

(22) Filed: Jun. 23, 2011

(65) Prior Publication Data

US 2012/0331107 A1   Dec. 27, 2012

(51) Int. Cl.
*G06F 15/16* (2006.01)
(52) U.S. Cl.
USPC .................... 709/230; 709/228; 709/232
(58) Field of Classification Search
USPC .......................... 709/230, 228, 232
See application file for complete search history.

(56) References Cited

U.S. PATENT DOCUMENTS

| | | | |
|---|---|---|---|
| 5,253,342 A | 10/1993 | Blount | |
| 5,764,625 A * | 6/1998 | Bournas | 370/231 |
| 6,891,818 B1 | 5/2005 | Jarvisalo | |
| 7,333,431 B2 * | 2/2008 | Wen et al. | 370/230.1 |
| 7,395,344 B2 | 7/2008 | Sandell et al. | |
| 7,502,860 B1 * | 3/2009 | Champagne | 709/227 |
| 7,984,166 B2 * | 7/2011 | Simcoe et al. | 709/228 |
| 8,438,248 B2 * | 5/2013 | Li et al. | 709/220 |
| 2001/0052020 A1 | 12/2001 | Brodie | |
| 2005/0068896 A1 | 3/2005 | Pazos | |
| 2005/0122977 A1 | 6/2005 | Lieberman | |
| 2005/0140787 A1 | 6/2005 | Kaplinsky | |
| 2005/0177625 A1 | 8/2005 | Paek et al. | |
| 2005/0267860 A1 | 12/2005 | Benguigui | |
| 2007/0130281 A1 | 6/2007 | Sandell | |
| 2010/0217889 A1 | 8/2010 | Simcoe | |

(Continued)

FOREIGN PATENT DOCUMENTS

| | | |
|---|---|---|
| CN | 101222395 | 7/2008 |
| JP | 2001268093 | 9/2001 |
| KR | 20030037917 | 5/2003 |

OTHER PUBLICATIONS

Koustonikolas et al, "On TCP Throughput and Window Size in a Multihop Wireless Network Testbed", WinTECH '07 Proceedings in the second ACM international workshop on Wireless network testbeds, experimental evluation and characterization, ACM, 2007, pp. 51-58.*

(Continued)

*Primary Examiner* — Aaron Strange
(74) *Attorney, Agent, or Firm* — Fogg & Powers LLC

(57) ABSTRACT

Systems and Methods for Negotiated Accelerated Block Option for Trivial File Transfer Protocol are provided. In one embodiment, a method for implementing a negotiated accelerated Trivial File Transfer Protocol (TFTP) file transfers, the method comprising: transmitting a TFTP request packet for accelerated transfer from a requesting device to a serving device; receiving a response from the serving device; determining whether to initiate an accelerated transfer by evaluating the response packet from the serving device; and when evaluating the response packet indicates that the serving device accepts acceleration, initiating an accelerated TFTP file transfer using a negotiated block acceleration value, wherein the negotiated block acceleration value is negotiated by the client device and the Accelerated TFTP Server Engine based on one or both of hardware constraint factors and transmission statistics.

20 Claims, 6 Drawing Sheets

(56) References Cited

U.S. PATENT DOCUMENTS

| | | | |
|---|---|---|---|
| 2011/0055422 | A1 | 3/2011 | Simcoe |
| 2011/0099221 | A1* | 4/2011 | Chang .......................... 709/203 |
| 2012/0143993 | A1* | 6/2012 | Russo et al. .................. 709/219 |

OTHER PUBLICATIONS

"Extending TFTP", "Retrieved from http://www.compuphase.com/tftp.html on May 20, 2011", pp. 1-6, Publisher: Compu Phase, Published in: Bussum, Netherlands.

Johnston, "TFTP Streaming Definition", Jun. 2003, pp. 1-13, Publisher: http://tools.ietf.org/id/draft-johnston-tftp-stream-00.txt.

"Google Scholar Search Sequential Transfer Send Date Ahead of Acknowledge", "Accessed Jan. 12, 2011", Jan. 25, 2011, pp. 1-2.

"How the PXE Server Works", "TechNet retrieved from http://technet.microsoft.com/en-us/library/cc732649(WS.10,printer).aspx on May 20, 2011", May 8, 2008, pp. 1-3, Publisher: Microsoft.

"How to Modify the BCD SOTRE Using BCDEDIT", "TechNet retrieved at http://technet.microsoft.com/ed-us/library/cc731245(WS.10,printer).aspx on May 20, 2011", May 8, 2008, pp. 1-9, Publisher: Microsoft.

"Trivial File Transfer Protocol", "Retrieved at http:/en.wikipedia.org/wiki/Trivial_File_Transfer_Protocol on May 20, 2011", pp. 1-4, Publisher: Wikipedia.

* cited by examiner

SYSTEMS AND METHODS FOR NEGOTIATED ACCELERATED BLOCK OPTION FOR TRIVIAL FILE TRANSFER PROTOCOL (TFTP)

BACKGROUND

Commercial aviation systems are being designed to load their operational software via the Aeronautical Radio, Incorporated (ARINC) 615A specification, which uses the Trivial File Transfer Protocol (TFTP) as defined by RFC 1350. On a fast network, TFTP is a satisfactory file transfer protocol. On a slow network, TFTP becomes bogged down due to the Data/Acknowledgement (ACK) handshake between the client and server. The issue is that the ARINC 615A TFTP communication is being performed on a secure aircraft network where the loading paths are not given enough bandwidth to support the amount of data transferred. This is the case since the network bandwidth is mostly dedicated to flying the airplane. This combination of TFTP and a slow aircraft network causes the software load times to increase dramatically, thus increasing the aircraft downtime. Other commercial systems have solved this issue by going to a different file transfer protocol, but changing file transfer protocols for this application is not possible due to the ARINC 615A definition.

For the reasons stated above and for other reasons stated below which will become apparent to those skilled in the art upon reading and understanding the specification there is a need in the art for methods and systems for improved data transfers.

SUMMARY

The Embodiments of the present invention provide methods and systems for an accelerated block option for TFTP file transfers and will be understood by reading and studying the following specification.

In one embodiment, a method for implementing a negotiated accelerated Trivial File Transfer Protocol (TFTP) file transfers, the method comprising: transmitting a TFTP request packet for accelerated transfer from a requesting device to a serving device; receiving a response from the serving device; determining whether to initiate an accelerated transfer by evaluating the response packet from the serving device; and when evaluating the response packet indicates that the serving device accepts acceleration, initiating an accelerated TFTP file transfer using a negotiated block acceleration value, wherein the negotiated block acceleration value is negotiated by the client device and the Accelerated TFTP Server Engine based on one or both of hardware constraint factors and transmission statistics.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention define an option for TFTP that accelerates a TFTP file transfer in a manner negotiated between the TFTP server and client to reduce the overall file transfer time. Current operations of TFTP are not altered. Instead, embodiments of the present invention expand upon it. With embodiments of the present invention, an initial set of one or more data blocks are sent early. That is, a data block is transmitted without waiting for the corresponding ACK for the previously transmitted block. This allows the sender to keep its transmit line continuously full of data, instead of sending a block of data and then going idle while waiting for the corresponding ACK. TFTP remains the primary protocol managing the file transfer, so systems that don't support the new option are still compatible with systems that do. The number of blocks to be accelerated are negotiated to provide an optimal file transfer rate given hardware constraints, network configuration and current network throughput considerations. In addition, in some alternate embodiments as described below, once acceleration has been established, block sizes can be negotiated down in size to increase overall file transfer rates. Embodiments of the present invention have the benefit of expanding upon the existing TFTP transfer protocols instead of creating a whole new file transfer protocol and are applicable to any instance of TFTP implementation.

Figure 1A:
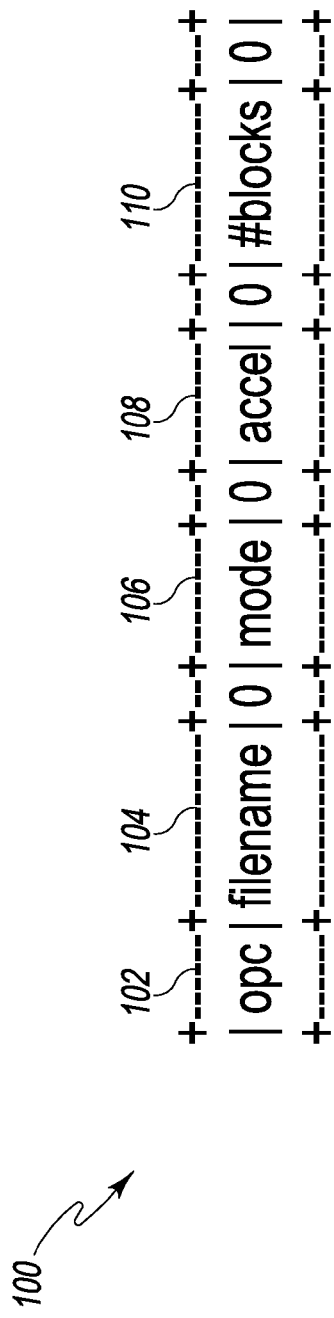
FIGS. 1A and 1B illustrate Accelerated TFTP request packets of one embodiment of the present invention.

FIG. 1A illustrates a TFTP request packet 100 of one embodiment of the present invention. The TFTP request packet 100 provides an expansion to a standard TFTP request packet by introducing the acceleration option explained herein. As shown in FIG. 1, TFTP request packet 100 comprises an opcode field (opc) 102, a filename field 104 and a mode field 106. The opcode filed 102 will contain a 1 for a file read request (RRQ) and a 2 for a file write request (WRQ). The filename field 104 will contain the name of the file to be read or written. The mode field 106 specifies the mode of the file transfer (for example, "netascii", "octet", or "mail").

TFTP request packet 100 further comprises an acceleration option field 108 that, when the acceleration option is requested, indicates such by including, for example, the term "accel" or other predetermined option indicator. The "#blocks" field 110, when the acceleration option is selected, indicates a number ("N") of TFTP blocks the file transfer will be ahead. This is also referred to as the number of blocks in the accelerated transfer windows. That is, the value N in "#blocks" field 110 indicates the number of additional blocks that will be initially transmitted by the transmitter, without pausing to wait to receive corresponding "ACK" messages from the receiver.

Figure 1B:
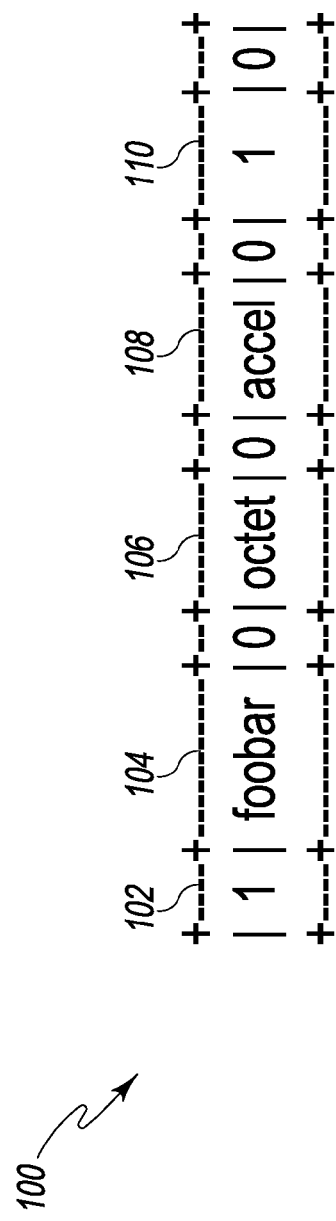

FIG. 1B, shown at 120 is one example of an implementation of TFTP request packet 100 discussed in FIG. 1A. In FIG. 1B, TFTP request packet 120 is a read request (indicated by opcode field 102), for a file named "foobar" (indicated by filename field 104), in octet (binary) transfer mode (indicated by mode field 106), with an acceleration option selected (indicated by acceleration option field 108) of 4 blocks (indicated by #blocks field 110). TFTP request packet 120 is sent by a client to a server to initiate the file transfer. Additional information regarding TFTP protocol options extensions can be found in Internet Engineering Task Force (IETF) Request for Comments (RFC) number 2347, which is incorporated herein by reference.

Figure 2:
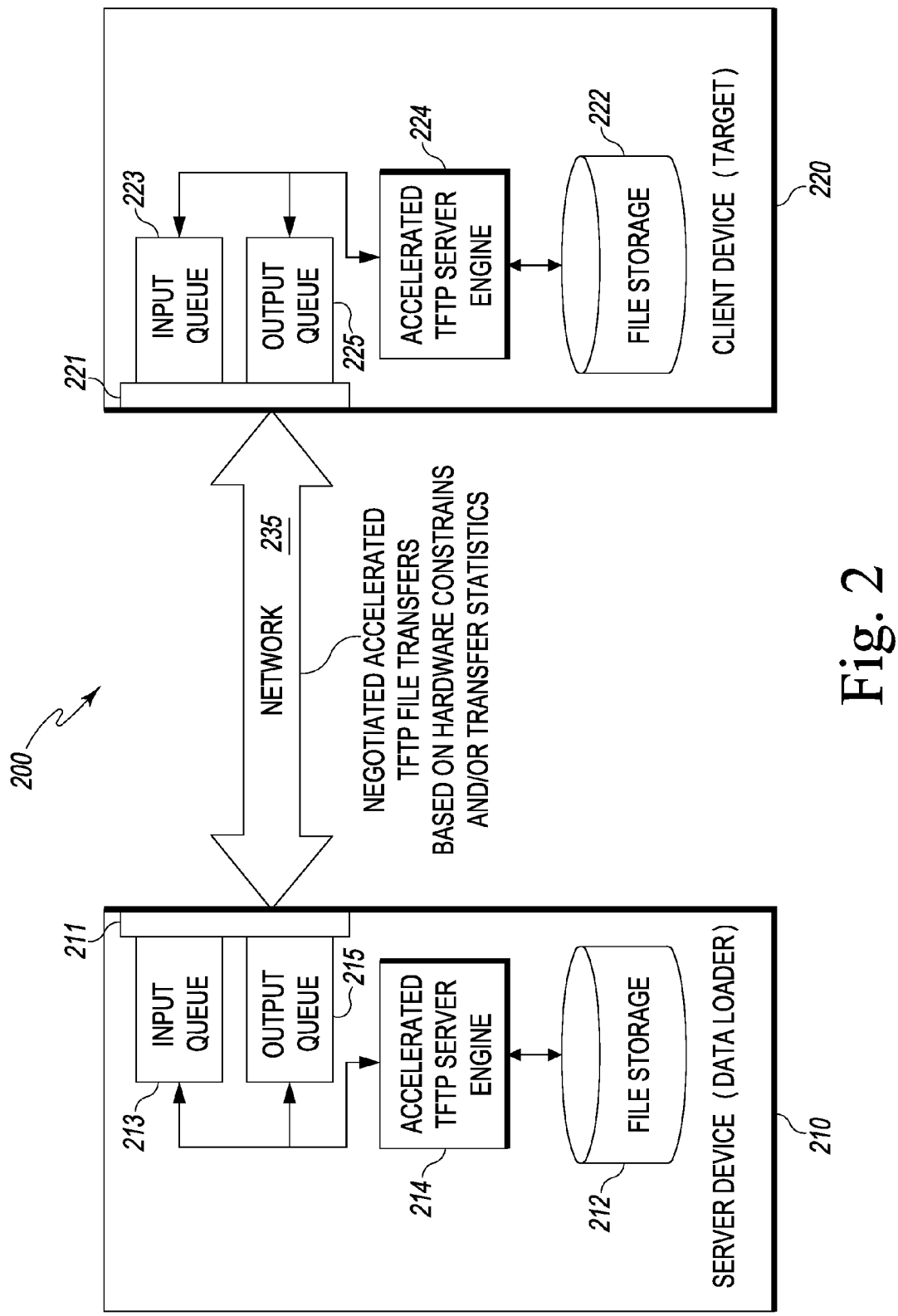
FIG. 2 is flow chart illustrating a method for initiating an accelerated file transfer of one embodiment of the present invention.

FIG. 2 is a block diagram illustrating a system 200 of one embodiment of the present invention. System 200 includes a server device 210 and a client device 220 coupled to communicate over a network 235. Network 235 comprises devices for establishing either wired or wireless communication links (or a combination thereof) and may further comprise one or more intervening network components between server device 210 and client device 220 such as, but not limited to, routers, gateways, switches and physical connection interfaces.

Server device 210 comprises a storage device 212 for storing files, an input queue 213 (i.e. a buffer) for storing data blocks received from a network interface 211 coupled to network 235, and an Accelerated TFTP Server Engine 214. In alternate implementations, the buffer size of input queue 213 will vary (for example, 16 k, 64 k etc.). In one embodiment, Accelerated TFTP Server Engine 214 is implemented as a software module executed by a controller or a processor. In alternate embodiments, Accelerated TFTP Server Engine 214 is implemented through dedicated hardware. Accelerated TFTP Server Engine 214 performs the server side accelerated TFTP file transfer and negotiation functions described below.

Client device 220 comprises a storage device 222 for storing files, an input queue 223 coupled to a network interface 221 coupled to network 235, and an Accelerated TFTP Client Engine 224. In alternate implementations, the buffer size of input queue 223 will vary (for example, 16 k, 64 k etc.). In one embodiment, Accelerated TFTP Client Engine 224 is implemented as a software module executed by a controller or a processor. In alternate embodiments, Accelerated TFTP Client Engine 224 is implemented through dedicated hardware. Accelerated TFTP Client Engine 224 performs the client side accelerated TFTP file transfer and negotiation functions described below.

In one implementation, client device 220 is an avionics computer for an aircraft and server device 210 is a data-loader device for loading operational software onto client device 220 using the ARINC 615A protocol. In this configuration, client device 220 is a target device with which the data-loader 210 transfers files. Network 235 is an avionics network that allocates a data pipe to facilitate file transfers between the server 210 and the client 220. In one embodiment, the avionics network 235 provides a bidirectional full duplex Ethernet connection between server 210 and client 220.

Embodiments of the present invention enable server 210 and client 220 to reduce the time required to transfer files without the need to increase the bandwidth of network 235. For loading files onto the server 210, the client 220 pushes data blocks into the data pipe on an accelerated basis as described above. That is it will transmit an initial data block plus one or more additional data blocks into a transfer window on network 235, without waiting to receive an acknowledgement back from client 220. Similarly, when client 220 requests a file from server 210, the server 210 pushes an initial block plus one or more additional data blocks onto network 235 on an accelerated basis. If the server 210 does not support accelerated TFTP or for some other reason rejects an accelerated TFTP request from client 220 (for example, by not responding to a TFTP request for an accelerated option), then client 220 can revert to a non-accelerated TFTP file transfer.

That is, if the server 210 is willing to accept the acceleration option, it replies with an Option Acknowledgement (OACK) to the client 220. The server 210 may transmit back to the client 220 a Option Acknowledgement (OACK) that indicates that the server is willing to accelerate based on the #blocks value 110 specified by the client 220. Alternatively, the server 210 may transmit back to the client 220 an Option Acknowledgement (OACK) that indicates the server will grant the acceleration option, but at an acceleration different than the value specified by the client. The process for arriving at an optimal number of blocks to accelerate onto network 235 is based on several considerations which are described in greater detail below.

Figure 3:
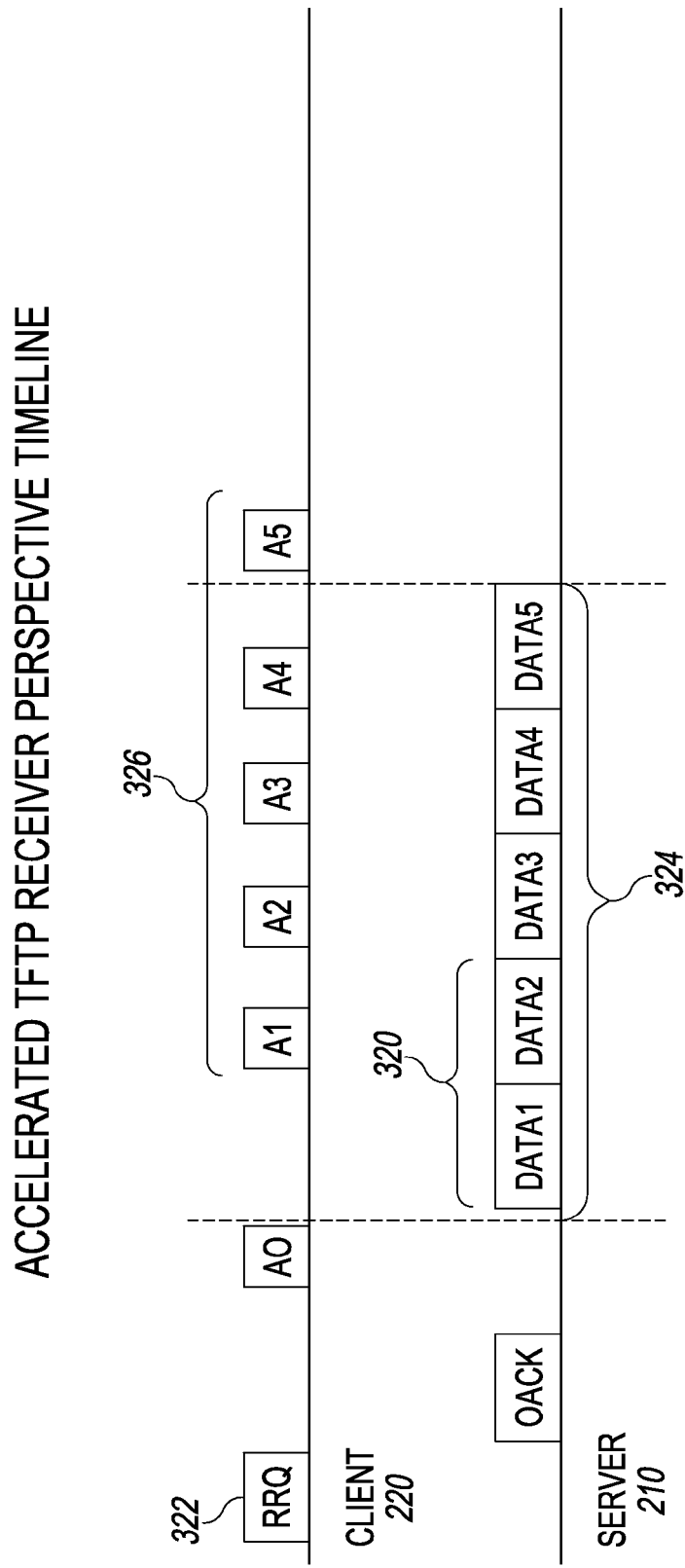
FIG. 3 is flow chart illustrating a method for an accelerated file transfer of one embodiment of the present invention.

By having the sending device transmit a negotiated number of blocks ahead of the ACK received from the receiver, the network overhead of waiting for an ACK response for each data block is removed. As shown in FIG. 3, for embodiments of the present invention, when client 220 sends a TFTP request packet for accelerated transfer 322 to receive a file from a server 210, a negotiation occurs to determine the number of blocks 324 of the file that will be included in the transfer window 320 for that file. The transfer window 320 comprises a first block (DATA 1) and N additional blocks of the file as agreed upon by server 210 and client 220. For the example of FIG. 3, the block acceleration value (N) is equal to one so that two blocks are within the transfer window 320. Each file transfer is separately negotiated, permitting the server 210 and client 220 to adapt and converge on an optimal value for N over a course of sequential file transfers.

The N+1 data blocks initially transmitted by server 210 to fill transfer window 320 are not delayed in time. To acknowledge a valid receipt of a data block, Client 220 will transmit ACK messages back to the server 210 that identify received data blocks (shown generally at 326). Due to the acceleration, the client 220 will find that after sending the ACK, the next data block is already available in the input queue 223 because it had already been transmitted by the server 210 without delay. That is, the client processes the inbound data serially by receiving the first data block (DATA 1), processing DATA 1, and sending an ACK for the first block (A1). This all accomplished while the second data block (DATA 2) is already being received by the client 220's input queue 223, or is already sitting in the input queue 223 waiting to be processed. Right after the ACK A1 is transmitted to acknowledge receipt of DATA 1, the client will find the second data block (DATA 2) already in its input queue 223. To the client 220, the transmission of acknowledgement A1 and the reception of DATA 2 were almost instantaneous. This pre-transmission pushes data blocks onto the network 235 to enhance the transmit line utilization.

With embodiments of the present invention, the larger the file, the greater the benefit. From the server 210's perspective, the server 210 would send DATA 2 right after it sends DATA 1 at the start of a TFTP file transfer. For an acceleration value of N=1 (that is, a transfer window 320 of 2 blocks) upon receiving ACK A1, the server would be ready to send DATA 3 instead of DATA 2, because DATA 2 was already transmitted.

Embodiments of the present invention determine how many data blocks can be accelerated given the hardware being used for the transfer and current network conditions. Considerations that can go into the determination of the transfer window size include, but are not necessarily limited to: input buffer size, file transfer rates vs. client file processing rates, network configuration (i.e., the number of network hops between a server and client), the amount of data retransmission necessary due to network reliability, the processing speed of the server and client, and the ability to make dynamic/adaptive adjustments to the transfer window size from one file transfer to the next. Given these considerations, a client 220 can make an intelligent decision on how much acceleration the current configuration can support and requests a TFTP file transfer with that acceleration accordingly.

The buffer size of input queue 223 plays a role in how many TFTP blocks can be accelerated because the server 210 cannot push accelerated blocks onto network 235 in such a way as to cause input queue 223 to overflow. That is, the TFTP block acceleration value should not exceed the maximum number of TFTP packets that can fit in the hardware buffer of input queue 223 at once taking into consideration the possibility of duplicated TFTP packets on the network. For example, if an of input queue 223 can only hold a maximum of three TFTP packets at once (ignoring the possibility of duplicate packets), then the TFTP block acceleration value should not go above three because doing so would cause unprocessed data packets within input queue 223 to be erroneously overwritten. Where the available buffer size at the receiver is not a constraint (for example, where the buffer is sufficiently large such that overwriting the input queue 223 is not a concern), then the remaining considerations will become the leading factors in determining the number of packets to accelerate.

The buffer sizes of the output queues 215 and 225 also play a potential role in how many TFTP blocks can be accelerated. That is, for a TFTP read request, server 210 could be acceleration limited based on its output queue 215. For a TFTP write request, client 220 could be acceleration limited based on its output queue 225.

For example, if output queue 215 has a buffer of 2K, then server 210 has several things to consider when figuring out the acceleration option for a TFTP read request. If the server 210 negotiates an acceleration of 2 for a block size of 2 k, then the server can only push 1 TFTP block into output queue 215, and then it must wait for the data to be transmitted before the next 2K block can be inserted into output queue 215. If the server 210 pumps the blocks into the output queue 215, only taking into consideration the acceleration option, the server 210 would corrupt the outgoing packets before they even hit network 325.

If the transmission on network 325 happens to be slow for some reason (for example, due to a shared transmitter), then the server 210 could potentially receive the ACK from a first packet before the second data packet has been transmitted. If this were the case, the acceleration would still work, since the server would always be trying to get ahead to the appropriate number of accelerated blocks. To make this most efficient, while the server 210 is waiting for the current block to be transmitted, it could check for any received ACK packets. If there is an ACK packet, the server could process the ACK packet, and then bump the up the block number to the next appropriate accelerated block number.

If instead of using a block size of 2 k, the server instead negotiates the block size to 1K and an acceleration of 2 (buffer size still at 2K), then the server 210 can at least put the first 1K of data in the output queue 215 and mark it ready for transmission while it gathers, builds, and copies the $2^{nd}$ 1K of data. This way at least some data gets out and the server 210 might actually be able to get up to the acceleration value, versus always being behind. In this case the acceleration option could mitigate the transmission seen on a server 210 (or client 220 in the case of a TFTP write request).

The transfer rate of a TFTP block over network 235 versus the processing rate of the receiver (e.g., client 220) plays a role in the maximum number of TFTP blocks that can be accelerated. For example, if the transfer rate over network 235 is slow and the processing rate of client 220 is fast, then client 220 can copy the inbound TFTP block out of the input queue 223 before the next inbound TFTP block arrives over network 235. In such a case, the acceleration option value (N) can be set by taking network reliability and overall bandwidth into consideration. A configuration such as this can achieve some TFTP block acceleration, even if the size of the input buffer on the receiver is relatively small (restricted to only 1 TFTP block, for example), because the server 210 can place data blocks on the network 235 at a rate as fast as can be supported by the network without causing a buffer overflow condition at input queue 223. Thus determining an optimum TFTP block acceleration value to use for a transfer would become more contingent on the reliability of the network and the frequency at which data packet re-transmissions are necessary due to network errors (for example, dropped packets or data corruption). This factor is addressed further below.

The number of intervening network components in network 235 between server device 210 and client device 220 (such as, but not limited to, routers, gateways, switches and physical connection interfaces also plays a role in how many TFTP blocks can be accelerated. This is because the number of network hops between such components will effectively reduce the overall TFTP block transfer rate for network 235. Thus, the delays cause by network hops lends itself to creating the situation discussed in the previous paragraph because it slows the transfer rate of data packets over network 235. At the same time, it effectively increases the buffer size as observed by server 210 because each of the of intervening network components will provide some level of buffer storage available to hold accelerated blocks, in addition to the buffer storage available at input queue 223.

In one scheme, the number of accelerated TFTP blocks negotiated between server 210 and client 220 would be set at the number of network hops plus one. So, for example, where there are three network hops on network 235 between the server 210 and the client 220, the TFTP block acceleration option value (N) is set a value of 4. For that case, server 210 will initially transmit five blocks onto network 235 (at the rate the network will accept) before waiting for the first ACK from client 220. In one embodiment, clients are aware of the particular position within in the aircraft's network structure from which the number of hops between itself and the dataloader can be determined. This may be accomplished, for example, by keyed pins sensed by a module when it is inserted into a particular slot.

It could also be advantageous to delay the sending of each accelerated block by the transmission delay cause by the first intervening network component. For example, assuming that the first intervening network components is a very simple switch that can only hold 1 packet for retransmission, this means that client 210 will transmit the first TFTP block to that switch where it will sit for a certain amount of time, say 100 ms. At 100 ms, the switch would forward the block onto the next intervening network component (or to client 220 if there is no next intervening network component). The server 210 would delay 110 ms before automatically sending the next accelerated block. This delay should guarantee that the first block has been forwarded by the first intervening network component before the second block get gets there. A configuration such as this can achieve TFTP block acceleration, even if the size of the input buffer at input queue 223 is only one TFTP block.

Network reliability and the frequency of the need to retransmit data blocks play a role in how many TFTP blocks can be accelerated. This is because errors cause by network deficiencies (networks that corrupt packets, drop packets, etc.) force the retransmission of data. In general, when a network is relatively unreliable, the block acceleration value (N) should be set low, and when the network is relatively reliable, the block acceleration value (N) can be raised higher. For example, when the block acceleration value is set to a high value a large number of blocks will be initially transmitted. On an unreliable network, there is a higher probability that any one block will be corrupted and rejected by the receiver. When this occurs, the corrupted block and every subsequent block pre-transmitted by the server will need to be re-transmitted. This is because the TFTP protocol requires blocks to be transmitted in sequential order. For example, where the block acceleration value (N) is set to 100, then after a corrupted block is rejected by client 220, server 210 will need to retransmit the corrupted block and retransmit the next 100 blocks regardless of whether they were successfully transmitted the first time. For a network with a high rate of errors, this could mean that large number of data blocks would end up re-transmitted multiple times, which is highly inefficient and reduces overall network bandwidth. In the case of an unreliable network, it can be more efficient to accelerate by only a few blocks of data, or even default to no acceleration, and have the blocks acknowledged as a smaller sets to reduce the occurrence of retransmitted data.

The relative processing speeds of the transmitter and receiver also plays a role in how many TFTP blocks can be accelerated onto a network. For example, when the processing speed of server 210 is slower than the processing speed of client 220, then client 220 has the ability to process data blocks stored in input queue 223 at a faster rate than server 210 can push them into input queue 223. In this situation, one scheme would be to set the block acceleration value (N) based on the number of TFTP ACK packets that server 210 can hold in its input queue 213 since it would be server 210 that would be the critical path component in processing packets. Conversely, when the receiver is slower than the transmitter, the block acceleration value (N) should be set based on the number of TFTP Data packets the receiver's input queue can hold at once, since it would be the receiver's queue that would be filling up in that case.

Several of the factors discussed above, such as the input queue buffer sizes at the server device and client device, the number of intervening network components in the network between the server device and the client device, the buffer sizes and forwarding speeds of any such intervening network components, the processing speeds of the server device and client device, and the maximum operating data transmission rate of the network, are constants and factors that can be identified apriori before beginning a file transfer. Others, such as network reliability and achievable data throughput, either vary over time or cannot be assessed until after one or more file transfers are attempted.

Because embodiments of the presented invention provide for negotiated TFTP acceleration option, then in addition to accelerating TFTP file transmittals using a specified block acceleration value (N), that value can be determined based on actual network conditions and performance.

That is, when given the typical file loading situation where a large number of files need to be transferred, the block acceleration value (N) for each file is separately negotiated, permitting the server 210 and client 220 to adapt and converge on an optimal value for N over a course of sequential file transfers. For example, in one embodiment, client 220 sends an TFTP request packet to server 210 specifying an initial block acceleration option value of $N_1$. That value would be some value less than of equal to $N_{max}$, which is the maximum number of blocks that could theoretically be accelerated based on the constant factors of the network design discussed above.

A first file is then transmitted onto network 235 using TFTP using the acceleration of $N_1$ blocks. In one embodiment, during the transfer, the accelerated TFTP client engine 224 keeps track of transfer statistics such as, but not limited to, how fast data is being received into input queue 223, whether input queue 223 always has at least one data block present in the buffer, a look ahead to confirm whether input queue 223 has the next available block present, and the frequency of occurrence that the current block being processed is corrupted and needs to be retransmitted. If the first file is successfully transferred and the transfer statistics indicate that network 235 has the capacity to support additional acceleration, then when client 220 sends its next TFTP request for the second file, it will specify an initial block acceleration option value of $N_2=N_1+c$, where c would typically be equal to 1. During transmission of the second file and subsequent files, transfer statistics are analyzed to determine if still further acceleration is possible, up to the theoretical maximum value of $N_{max}$ (which is based on hardware constraints). If a file is not transferred successfully, required a significant number of packet retransmissions, or produced other undesirable transfer statistics, then the next file transfer request would specify a block acceleration option value less than that requested for the previous file transfer. In this way the client and server will, over the course of a sequence of file transfers, converge on an optimal block acceleration value and/or adapt to changes in network through-put.

Figure 4:
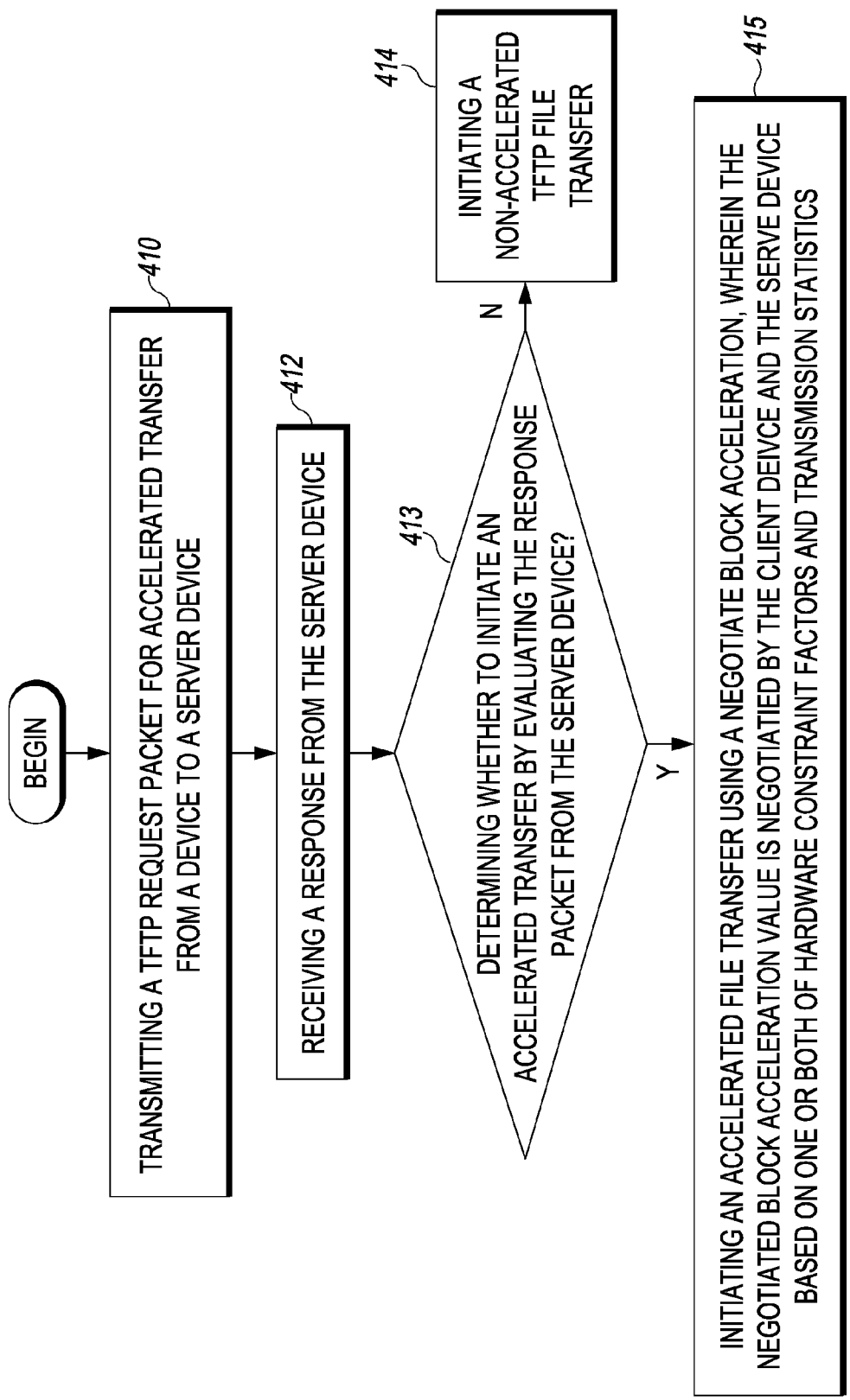
FIG. 4 is flow chart illustrating a method of one embodiment of the present invention.

FIG. 4 is a flow chart illustrating a method for implementing a negotiated accelerated TFTP protocol file transfer of one embodiment of the present invention. In one embodiment, this method is applied using hardware such as depicted and described with respect to FIG. 2. The method begins at 410 with transmitting a TFTP request packet for accelerated transfer (that is, with a proposed initial block acceleration value selected) from a client device to a server device. In one embodiment, the proposed block acceleration value initially selected by the client is based on apriori knowledge regarding certain hardware configuration factors such as the client's input queue buffer size, processor speed, the number of and hardware constrains of any intervening network components between it and the server, and the maximum operating data transmission rate of the network. In one embodiment, the proposed initial block acceleration value is further determined based on transmission statistics collected during any previous file transfers performed between the client and the server.

The method proceeds to 412 with receiving a response from the server device. This response will come from the server in the form of an Option Acknowledgement (OACK). Like the client, the server also has apriori knowledge regarding certain hardware configuration factors such as the server's own input queue buffer size and processor speed. In one embodiment, the server collects its own set of transmission statistics such as those collected by the client described above. If based on these hardware configuration factors and/or transmission statistics, the server concludes that it can support the proposed initial block acceleration value initially selected by the client, then the server sends an acknowledgment back to the client to that affect. If the server instead concludes that it cannot support an accelerated transfer, but not the initial block acceleration value proposed by the client, then the server sends an option acknowledgment back to the client proposing a block acceleration value less than the initial block acceleration value. Also, if for some reason the server does not support the accelerated TFTP option, it would send an acknowledgment back to the client indicating its rejection of the option. In that case, the file transfer would be performed without acceleration.

Accordingly, the method proceeds to 413 with determining whether to initiate an accelerated transfer by evaluating the response packet from the server device. As mentioned above, the response packet can indicate to the client 1) to proceed with an accelerated file transfer using the initial block acceleration value, 2) proceed at a block acceleration value less than the initial block acceleration, or 3) proceed with a non-accelerated file transfer.

In the latter circumstance, when evaluating the response packet indicates that the server rejects acceleration, (checked at 413) the method proceeds to 414 with initiating a non-accelerated TFTP transfer. This could occur if, for example, the server simply does not support the TFTP acceleration option. The server's rejection of an accelerated transfer request can also occur when the server, based on collected transmission statistics, determines that a block acceleration value of zero is optimal. If no Option Acknowledgement (OACK) or an Option Acknowledgement (OACK) without the accelerated transfer option is received in response to the TFTP request, that also indicates that the server has rejected (or otherwise does not recognize) the request for an accelerated transfer and the method proceeds to 414 with initiating a non-accelerated TFTP file transfer. Reception of an ACK packet in response to a TFTP write request, or a DATA packet in response to a TFTP read request would also indicate that the accelerated transfer option was either rejected or not recognized by the server. In both of those cases, the method would also proceed to 414 to initiate a non-accelerated TFTP transfer. When evaluating the response packet indicates that the server accepts acceleration (checked at 412), the method proceeds to 415 with initiating an accelerated file transfer using a negotiate block acceleration, wherein the negotiated block acceleration value is negotiated by the client device and the server device based on one or both of hardware constraint factors and transmission statistics.

The process of FIG. 4 is performed prior to transferring each file. Accordingly, for each iteration in which the method is performed, the initial block acceleration value proposed by the client could be equal to a previously used negotiated block acceleration value, or a value either greater than or less than the previously used negotiated block acceleration value depending on transfer statistics gather during one or more previous transfers.

Figure 5:
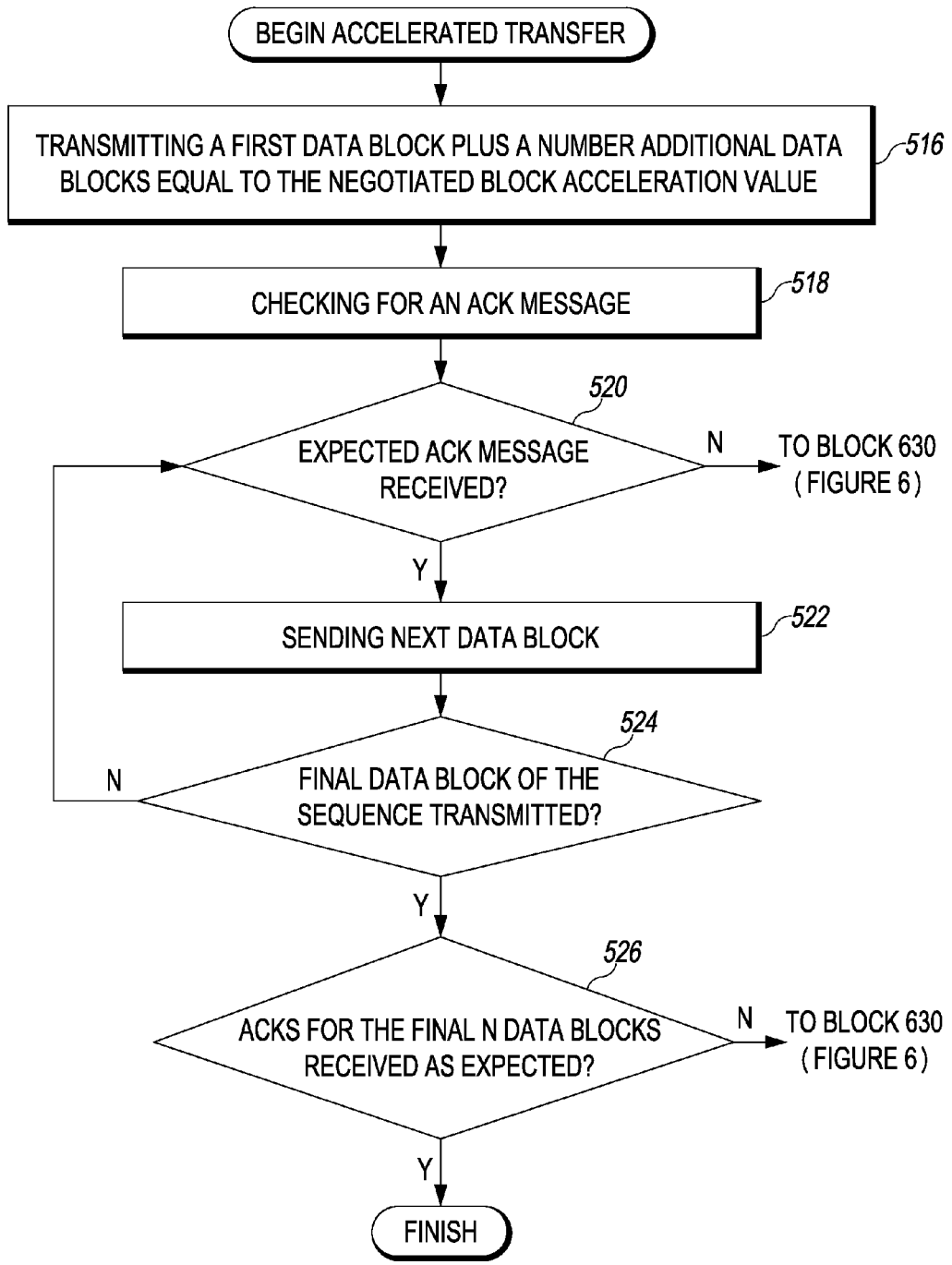
FIG. 5 is flow chart illustrating a method of one embodiment of the present invention.

FIG. 5 is a flow chart illustrating a method for performing the accelerated file transfer using a negotiate block acceleration as determined in FIG. 4. As would be appreciated by one of ordinary skill in the art upon reading this specification, when a file transfer needs to be transferred from the client to the server, the methods of FIGS. 4 and 5 are applicable as show, except that the rolls described with respect to the server and client are reversed.

FIG. 5 is a flow chart illustrating a method for transferring a file using the accelerated TFTP protocol file transfer of one embodiment of the present invention. The method shown in FIG. 5 provides for a file transfer wherein the sending device (that is, the device sending the file) will accelerate data block transmissions by the negotiated block acceleration value determined by the method of FIG. 4. The method begins the negotiated accelerated transfer by proceeding to 516 with the server (which is the sending device for the purpose of this example) transmitting a first data block plus a number additional data blocks equal to the negotiated block acceleration value (in other words, N+1 data blocks total) to the client without waiting for an acknowledgement (ACK) from the receiving device. That is, the sending device will transmit each of the N+1 data blocks consecutively at a rate dictated by the transmission medium and will not pause between data blocks to wait for an ACK message from the receiver. For example, if the block acceleration value is equal to two, the transmitter will transmit three consecutive data blocks as just described. Block 516 thus places the sending device N data blocks ahead of the receiving device.

The method proceeds to block 518 with checking for an ACK message. With the sending device now accelerated ahead of the receiving device by the desired number of data blocks, the file transfer now proceeds by sending one data block per ACK message received. Thus when an expected ACK message is received (checked at 520), the method proceeds to 522 with sending another data block, until the final data block of the sequence is transmitted (checked at 524). For example, after transmitting the first data block plus N additional data blocks, the sending device will pause until it receives an ACK indicating that the first data block was successfully received by the receiving device. The sending device would then transmit data block 2+N. The sending device next expects to receive an ACK with a data block number of 2 from the receiver. Upon receiving the ACK for data block 2, the sending device would then transmit data block 3+N. Assuming no errors take place, when the sending device receives an ACK with a data block number of M, it will next transmit data block M+N+1 to the receiver until the last data block is transmitted. At that point, the method proceeds to 526 with verifying receipt of ACKs for the last N data blocks. When an expected ACK message is not received (either at 520 or 526), the method proceeds to block 530 for data recovery as discussed with respect to FIG. 4 below.

Figure 6:
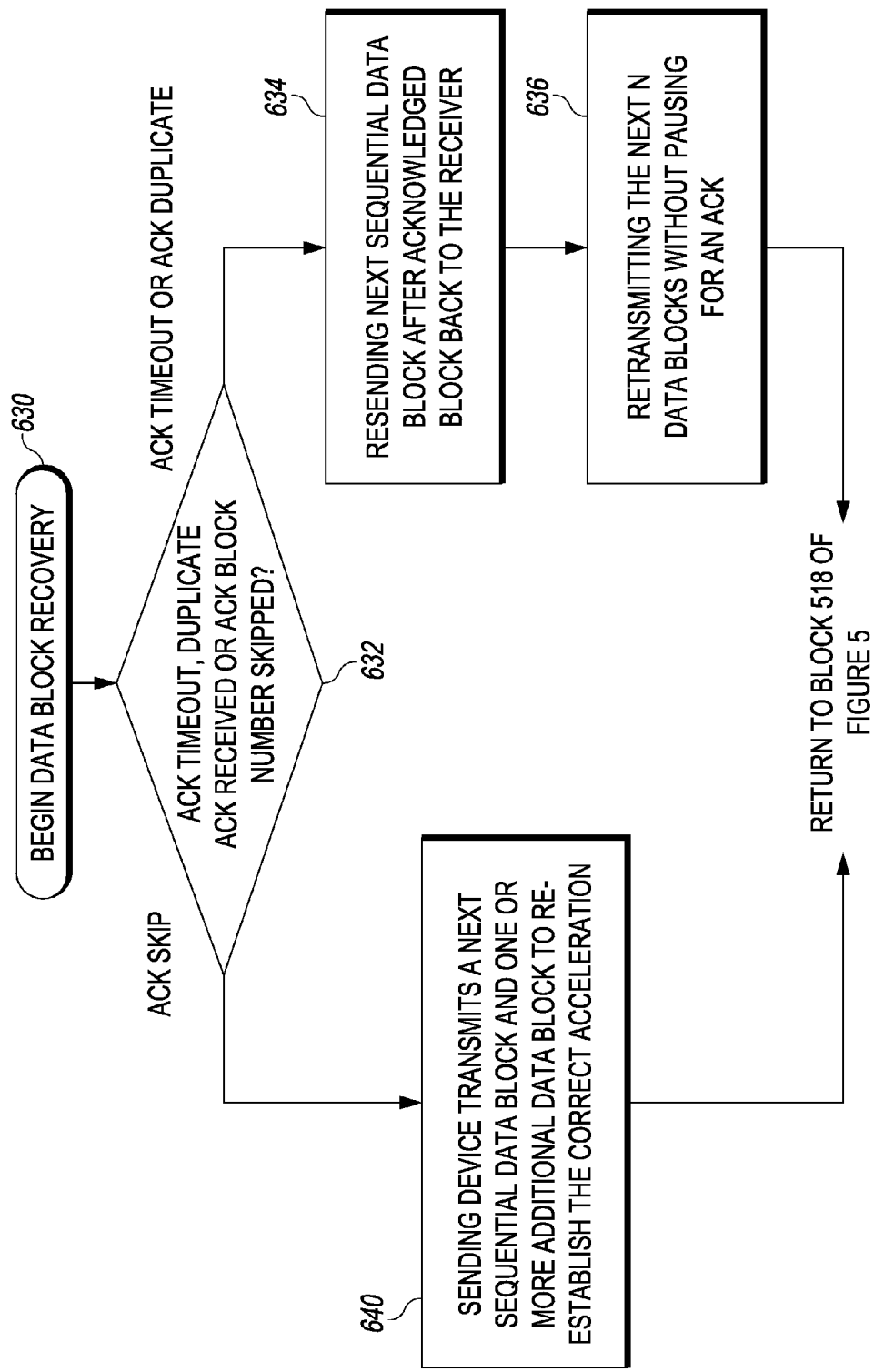
FIG. 6 is flow chart illustrating a method of one embodiment of the present invention.

When an expected ACK message is not received (either at 520 or 526), the method proceeds to block 630 of FIG. 6. When the receiving device fails to receive the next expected data block in the sequence, it waits for a time-out period to re-transmit the ACK of the last data block it successfully received. The receiver would then empty its input queue to throw away any data blocks that have a block number greater than the block number the receiving device was expecting (these are the blocks the sending device has pre-transmitted) while it waits for the retransmission of the missing data block. In an alternate embodiment, when the receiving device is expecting the next data block in the sequence to be data block X and instead it next receives data block X+1, the receiving device can use the receipt of data block X+1 to indicate a failed reception of the data block X. The receiving device thus can re-transmit the ACK of data block X immediately upon reception of the data block X+1 instead of waiting for the full timeout period.

FIG. 6 thus illustrates a data recovery process method for transferring a file using the accelerated TFTP protocol file transfer of one embodiment of the present invention beginning at 630. When the sending device receives a duplicate ACK from the receiver (checked at 632), the method proceeds to 634 with resending the next sequential data block after the acknowledged block back to the receiver. For example, should the sending device receive an ACK for data block 12 followed by another ACK for data block 12, the sending device will respond by resending data block 13. To reestablish acceleration, the method proceeds to 636 with also retransmitting the next N blocks without pausing to wait for an ACK. This places the sender back ahead of the receiver. The method then returns to block 618 of FIG. 3.

If an ACK packet transmitted by a receiving device is lost or corrupted, there is no effect on the receiving device because it will already have the next data block ready in its input queue for processing. The sending device however will see a skip in the block numbers associated with the ACK packets. In this case, the sending device would have to recognize that it was no longer N blocks ahead of the client. In response to the ACK received, the sending device would transmit the next data packet and pre-ship one or more additional data blocks to re-establish the correct acceleration. For example, if the #blocks value of N is 2 for a file transfer and the sending device is expecting an ACK for data block 10, normally it would respond by transmitting data block 13. If instead it receives an ACK for data block 11, the sending device would transmit data block 13 and also pre-ship data block 14 without pausing to wait for an ACK. This would re-establish the sending device at the correct acceleration of 2 blocks ahead of the receiver. Similarly, if the above sending device expecting an ACK for data block 10 instead receives an ACK for data block 12, the sending device would transmit data block 13 and also pre-ship data blocks 14 and 15 without pausing to wait for an ACK.

Thus, the method further includes at 632 checking for a skip in ACK block numbers. If an ACK message skip occurs, the method proceeds to 640 where the sending device transmits a next sequential data packet and one or more additional data block to re-establish the correct acceleration. The method then returns to block 518 of FIG. 5.

It is also possible for errors to occur during the process of pre-transmitting data blocks. Accordingly, in one embodiment the sending device looks for ACKs from the receiver while establishing the correct acceleration, even though it does not wait (i.e. pause) for the ACKs when pre-transmitting the N additional data blocks. If an ACK message error occurs while attempting to reach the maximum accelerated block value (e.g., a duplicate ACK message, an out of sequence ACK message, or an exceeded ACK timeout period) the sending device will proceed as described in FIGS. 5 and 6 without transferring further accelerated blocks. This may occur in situations where the accelerated block value is larger than the network bandwidth.

As would be appreciated by those of ordinary skill in the art reading this specification, block sizes for TFTP file transfers are structured so that a input queue buffer will hold at least two blocks (an original block and a retransmission block, in case of a timeout). For example, under traditional TFPT, with a 10 k buffer, convention wisdom would conclude that the optimal block size is just less than 5 k because that would provide the largest data through-put per block possible while minimizing the amount of bandwidth taken up by block overhead. However, one benefit of embodiments of the present invention is that with the negotiated acceleration option described above, a file transfer session can utilize much smaller block sizes while still increasing data through-put rate. For example, for a 10 k client buffer, a transfer session can set a block size to 1 k with an accelerated block value of 8, which would fill the buffer with a total of 9 k of data, thus still providing sufficient room in the buffer for a re-transmission block. Embodiments of the present invention thus allow for management of limited buffer space in ways different from those possible under traditional TFTP file transfers. That is, with negotiated acceleration tailored to the network, you can actually make block sizes smaller and as long as data is being pumped out 100% and you are utilizing the transmission pipe of the network 100% then you can transfer the whole file faster even though a greater number of total blocks are being transferred because there is no lag waiting for each data block to be acknowledged.

In alternate implementations of the embodiments described above, the file serving and receiving device also negotiate the block size used for file transfers based the hardware constraint factors and transmission statistics described above. This block size negotiation would occur, for example, at the beginning of each file transfer when the accelerated block value is negotiated.

That is, when a client requests a file with an initial block size value, it will also specify the size of the blocks that will be used to transmit the file. For example, where there is a 10 k file to transfer, the client and server can negotiate a block acceleration value of 6 with a block size of 1 k. The server would then divide the 10 k file into ten 1 k segments and push onto the network a first block with the first 1 k segment, and then pre-transmit six more blocks containing the next six 1 k segments.

With the block size is set to 1 k with an accelerated block value of 6, nearly the entire file could be received into the client's input queue buffer without the lag of waiting for ACKs back from the receiver. The client would quickly load and process that first 1 k block (faster than it could have processed a larger block), immediately making room in the buffer for the next 1 k block to be received from the server. This provides a near serial file block transmission scheme that allows file transfers to occur at a rate closer to the actually capacity of the network.

One hardware constraint factor potentially pertinent to the client and server's negotiation of a block size for an accelerated transfer is the buffer size of the receiving device's input queue. For example, given an input queue of a given buffer size, a percent of the buffer is set aside for margin to compensate for slop in the network. The balance must have room to handle at least two blocks of the anticipated size—that is, room for one real block and room for an errant duplicate of that block which might be subsequently received due to the network configuration.

For example, for a given buffer, taking 20% off for slop leaves 80% of the buffer. In that case, the maximum possible block size would be 40% the size of the buffer. Whether a smaller block size should be negotiated is based on whether the client is able to process the blocks in the input queue as fast as they are coming in from the network. This can be determine, for example, by a processing speed equation.

For example, given a 10 k buffer (with 20% reserved as margin), and a negotiated accelerated file transfer specifying a block acceleration value of 8 and a block size of 1 k, the question is whether the client can pull at least some of those 1 k blocks out of the input queue before the server pushed all 8 of the blocks into the input queue. If not, then the block size is too large for the negotiated acceleration because if there were some retransmission of data, the client would not have sufficient time to pull blocks out of the buffer before they are overwritten. As with the negotiated block acceleration value, in at least one implementation a performance assessment is utilized to converge on an optimal block size using the transfer statistics. For example, when a first file transfer indicates that a block size of 2 k and a block acceleration value is successful, the client and server might negotiate using a block size of 1 k and a block acceleration value of 8 for the next transfer. In this way, they converge on a block size for file transfers that is an optimal value over a course of sequential file transfers.

Several means of hardware are available to implement the systems and methods of the current invention as discussed in this specification. These means of hardware include, but are not limited to, digital computer systems, microprocessors, general purpose computers, programmable controllers and field programmable gate arrays. Therefore other embodiments of the present invention are program instructions resident on computer readable storage media which when implemented by such devices, enable them to implement embodiments of the present invention. Computer readable media include any form of physical computer data storage hardware, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions and code include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A network device for performing negotiated accelerated Trivial File Transfer Protocol (TFTP) protocol file transfers, the network device comprising:
an interface for coupling with a network;
an input queue that stores a plurality of TFTP data blocks of a file, the plurality of TFTP data blocks received from a server device via the network interface;
a file storage device; and
an Accelerated TFTP Client Engine for sequentially reading the plurality of data blocks from the input queue and saving the data blocks as a file to the file storage device, wherein how many data blocks of the plurality of data block are stored in the input queue at any one time is defined by a negotiated block acceleration value;
wherein the Accelerated TFTP Client Engine determines the negotiated block acceleration value from an exchange of request and acknowledgement TFTP packets between the client device and the server device via the network, wherein the negotiated block acceleration value is based on one or both of at least one hardware constraint factor and transmission statistics gathered from at least one prior file transfer;
wherein an initial block acceleration value is proposed based on a first hardware constraint factor that is a function of the number of intervening network device between the interface and the server device.

2. The network device of claim 1, wherein the Accelerated TFTP Client Engine sends a message to the server device proposing the initial block acceleration value;
wherein the negotiate block acceleration value is determined based on the server device's response to the initial block acceleration value.

3. The network device of claim 1, wherein the initial block acceleration value is proposed based on the hardware constraint factor, the hardware constraint factor further based on at least one of:
a buffer size of the input queue;
a buffer size of an output queue of the server device; or
a file transfer rate of the server device verses a file processing rate of the network device.

4. The network device of claim 1, wherein the initial block acceleration value is equal to the number of intervening network devices plus one.

5. The network device of claim 1, wherein the initial block acceleration value is further proposed based on the transmission statistics gathered from at least one prior file transfer, the transmission statistics including at least one of:
network reliability indicators;
data throughput statistics; or
frequency of retransmission information.

6. The network device of claim 1, wherein the negotiated block acceleration value is limited to a maximum number of blocks that could theoretically be accelerated to the network device as determined based on the at least one hardware constraint factor.

7. The network device of claim 1, wherein the Accelerated TFTP Client Engine and the server device converge on a negotiated block acceleration value that is an optimal value over a course of sequential file transfers.

8. The network device of claim 1, wherein the Accelerated TFTP Client Engine and the server device further negotiate a block size for file transfers based on one or both of the at least one hardware constraint factor and the transmission statistics gathered from at least one prior file transfer.

9. The network device of claim 8, wherein the Accelerated TFTP Client Engine and the server device converge on a block size for file transfers that is an optimal value over a course of sequential file transfers.

10. A network device for performing negotiated accelerated Trivial File Transfer Protocol (TFTP) protocol file transfers, the network device comprising:
an interface for coupling with a network;
a file storage device; and
an Accelerated TFTP Server Engine that loads files from the file storage device onto a client device via the network, wherein the Accelerated TFTP Server Engine, after transmitting an initial data block, pre-transmits a negotiated number of subsequent data blocks without pausing to wait for an acknowledgement (ACK) message from the client device for a prior transmitted data block; and
an input queue coupled to the interface configured to receive the acknowledgement (ACK) message from the client device;
wherein the Accelerated TFTP Server Engine determines the negotiated number of subsequent data blocks from a negotiated block acceleration value determined from an exchange of request and acknowledgement TFTP packets between the client device and the Accelerated TFTP Server Engine via the network, wherein the negotiated block acceleration value is based on one or both of at least one hardware constraint factor and transmission statistics gathered from at least one prior file transfer;

wherein an initial block acceleration value is proposed based on a first hardware constraint factor that is a function of the number of intervening network device between the interface and the server device.

11. The network device of claim 10, wherein when the Accelerated TFTP Server Engine receives a message from the client device proposing the initial block acceleration value, the Accelerated TFTP Server Engine send a response to the client,
wherein the negotiate block acceleration value is determined based on the Accelerated TFTP Server Engine's response to the initial block acceleration value.

12. The network device of claim 11, wherein the Accelerated TFTP Server Engine's response is based on the at least on hardware constraint factor, the at least one hardware constraint factor further based on at least one of:
a buffer size of the input queue;
a buffer size of an output queue that holds data blocks to be transmitted;
a number of intervening network device between the interface and the client device;
a file transfer rate of the network device verses a file processing rate of the client device; or
relative processing speeds of the network device versus the client device.

13. The network device of claim 11, wherein the Accelerated TFTP Server Engine's response is based on the transmission statistics gathered from at least one prior file transfer, the transmission statistics including at least one of:
network reliability indicators;
data throughput statistics; or
frequency of retransmission information.

14. The network device of claim 10, wherein the Accelerated TFTP Server Engine and the client device converge on a negotiated block acceleration value that is an optimal value over a course of sequential file transfers.

15. The network device of claim 10, wherein the Accelerated TFTP Server Engine and the client device further negotiate a block size for file transfers based on one or both of the at least one hardware constraint factor and the transmission statistics gathered from at least one prior file transfer.

16. The network device of claim 15, wherein the Accelerated TFTP Server Engine and the client device converge on a block size for file transfers that is an optimal value over a course of sequential file transfers.

17. A method for implementing a negotiated accelerated Trivial File Transfer Protocol (TFTP) file transfers, the method comprising:

transmitting a TFTP request packet for accelerated transfer from a requesting device to a serving device;
receiving a response from the serving device;
determining whether to initiate an accelerated transfer by evaluating the response packet from the serving device; and
when evaluating the response packet indicates that the serving device accepts acceleration, initiating an accelerated TFTP file transfer using a negotiated block acceleration value, wherein the negotiated block acceleration value is negotiated by the requesting device and the serving device based on one or both of hardware constraint factors and transmission statistics;
wherein an initial block acceleration value is proposed based on the hardware constraint factor, wherein the hardware constraint factor is a function of the number of intervening network device between the interface and the server device.

18. The method of claim 17, wherein initiating an accelerated TFTP file transfer using a negotiated block acceleration value further comprises:
pre-transmitting a negotiated number of subsequent data blocks without pausing to wait for an acknowledgement (ACK) message from the requesting device for a prior transmitted data block;
wherein the negotiated number of subsequent data blocks is equal to the negotiated block acceleration value.

19. The method of claim 17, further comprising negotiating a block size for file transfers between the serving device and the requesting device based on one or both of the at least one hardware constraint factor and the transmission statistics gathered from at least one prior file transfer.

20. The method of claim 17, wherein the at least one hardware constraint factor is further based on at least one of:
a buffer size of an input queue of the requesting device;
a buffer size of an input queue of the serving device;
a buffer size of an output queue of the requesting device;
a buffer size of an output queue of the serving device; or
a file transfer rate of the serving device verses a file processing rate of the requesting device; and
wherein the transmission statistics includes at least one of:
network reliability indicators;
data throughput statistics; or
frequency of retransmission information.

* * * * *